United States Patent [19]

Touval

[11] 3,897,389

[45] July 29, 1975

[54] FLAME RETARDANT COMPOSITIONS

[75] Inventor: Irving Touval, Edison, N.J.

[73] Assignee: M&T Chemicals Inc., Greenwich, Conn.

[22] Filed: Mar. 15, 1971

[21] Appl. No.: 124,447

Related U.S. Application Data

[62] Division of Ser. No. 869,366, Oct. 24, 1969, abandoned.

[52] U.S. Cl.. 260/45.75 B; 260/45.7 R; 260/45.8 A
[51] Int. Cl.² .................... C08F 6/00; C08G 83/00
[58] Field of Search ............. 260/45.75 B, DIG. 24; 106/15 FP; 117/138; 23/53

[56] References Cited
UNITED STATES PATENTS

| | | | |
|---|---|---|---|
| 3,108,016 | 10/1963 | Longstreth et al.................. | 117/138 |
| 3,133,037 | 5/1964 | Nagle et al....................... | 260/45.75 |
| 3,158,588 | 11/1964 | Johnson............................ | 260/45.75 |
| 3,205,196 | 9/1965 | Chreighton...................... | 260/45.75 |
| 3,418,263 | 12/1968 | Hindersinn et al. ............. | 260/45.75 |
| 3,560,441 | 2/1971 | Scwarcz et al................... | 260/45.75 |

*Primary Examiner*—V. P. Hoke
*Attorney, Agent, or Firm*—Robert P. Auber; Kenneth G. Wheeless; Robert Spector

[57] ABSTRACT

Antimony containing flame retardant compositions are provided for resins having reduced antimony content simultaneous with enhanced flame retarding efficiency, and consisting of sodium antimonate the particle size of which is within the range of between about 0.1–8 microns. In addition, an enhanced sodium antimonate flame retardant composition is provided by neutralizing the above noted sodium antimonate composition in the presence of an acid to a pH within the range of between about 6.8 and 7. Also provided are resins having improved flame retarding characteristics while simultaneously having improved color stability including reduced yellowness indices and sustained clarity.

8 Claims, No Drawings

FLAME RETARDANT COMPOSITIONS

This application is a division of co-pending application Ser. No. 869,366, filed Oct. 24, 1969 now abandomed.

Generally speaking, this invention relates to flame retardant compositions and the method for their preparation for introduction into various resins such as, for example, polyolefins in combination with halogenated organics and including polypropylene and polyethylene, synthetic fibers and polyesters in combination with a halogen source, plastisols, polyvinyl chloride, copolymers containing polyvinyl chloride, and other polymers and halogenated polymers. More particularly, this invention relates to antimony compositions for imparting flame zetardancy to resins as noted above simultaneously with a substantial reduction in antimony content from that necessary in the prior art for providing flame retardancy and with the resins produced in accordance herewith having improved color stability including reduced yellowness and sustained clarity over a much longer period of time than those resins produced in the prior art.

As well known, with the increased use of resin in the construction industry, in particular, the flame retardant characteristics of those resins have become increasingly important. Therefore, many efforts have been made to develop flame retardant additives for resins which will improve the flame retardant characteristics thereof while not causing deleterious effects to the final resin composition, such as, for example, decreasing the clarity of the desired clear and/or transparent resins and/or increasing the yellowness indices thereof. Moreover, if one visualizes the application of these resins in items of commerce in which literally thousands of a single object may be produced in a single production run the cost of the flame retardant components of the resins as well as the stabilizers therefor become very important.

As is well understood, the use of antimony oxide compositions has proved highly satisfactory for the purposes of imparting flame retardancy to such resin compositions without, in turn, interfering with the stability of the resins in the environment in which they are to be applied or during their preparation. However, one problem has arisen with such applications in that the antimony content of antimony trioxide, for example, is high and in the neighborhood of 83% antimony. Because of this, whereas antimony oxide compositions have proved effective for imparting flame retardancy, they are proving increasingly expensive because of the large content of antimony contained in them. Furthermore, they may be inappropriate in some applications where it is desired to have the final product in transparent form.

Thus, the problem arises where in order to impart effective flame retardancy to the particular useful resins as described herein reduces their usefulness in certain applications merely because of the high cost of the large quantity of antimony used therein. Also, their effectiveness may be reduced in certain applications where transparent resins and/or resins of true, non-variable color are desired.

By contrast, and quite unexpectedly, it has now been found in accordance with this invention that by reducing the particle size of sodium antimonate to within a particular range in accordance herewith that resins containing this composition have enhanced flame retardancy characteristics simultaneously with a greatly reduced antimony content. Furthermore, the flame retarded resins produced in accordance herewith maintain their color stability over a much longer period of time and have reduced yellowness indices. In addition, the particular antimony flame retardant compositions produced in accordance herewith, when neutralized by certain selected acids to within a particular pH range, have further enhanced flame retarding characteristics.

Accordingly, it is one object of this invention to produce flame retardants for resins as described herein which compositions have substantially reduced antimony content while enhancing the flame retarding characteristics of the resins into which they are incorporated. In addition, it is another object of this invention to produce such flame retardant compositions which produce effective flame retardancy in conjunction with improved color stability including reduced yellowness indices and sustained clarity of the resins into which the compositions are incorporated.

It is a further object of this invention to produce such high flame retardant compositions which achieve effective flame retardancy in conjunction with an absence of any deleterious effects on the stability of the particular resin compositions discussed herein or in the formulation thereof. A further object of this invention is to produce such flame retardant compositions which effectively prevent any increase in opacity of the final resin compositions noted herein thus being particularly effective for producing transparent resin compositions.

With the foregoing and additional objects in view, this invention will be described in more detail and other objects and advantages will be apparent from the following description and the appended claims.

Before describing this invention in more detail, it may be well to note that this invention has been found applicable to a wide variety of resins, such as halogenated polyolefins, polyvinyl chloride and copolymers containing polyvinyl chloride, and generally other polymers and polymers in combination with a halogen source. For example, satisfactory results have been achieved in accordance herewith, and under satisfactorily and economically attractive conditions on commercial scale operations by selecting a standard sodium aniimonate composition which is available in a particle size of within the range of between about 2–45 microns and with an average particle size of 8 microns and reducing this material by any known wet or dry reduction means to a particle size of within the range of between about 0.1–8 microns, and with the average particle size being approximately 1.5 microns. The resulting reduced product has a surface area of about 2545 $\times 10^4 cm^2/gm$, whereas the standard commercial product has a surface area generally about $25 \times 10^4 cm^2/gm$.

In considering generally the conditions for achieving the most enhanced results inconnection herewith, which conditions are more specifically set forth below, one may note that satisfactory flame retarded resin compositions are realized by introducing into the particular desired resin composition an amount of the particular flame retardant composition in accordance herewith of substantially the same amount of a standard already known antimony oxide formulation which would be introduced for the same purpose. Specifically, the sodium antimonate flame retardant compositions herein are introduced into the resins in the amount of between about 0.5 to 7 phr (parts per hundred parts resin), with the preferred range being between about 1 to 5 phr.

A preferred cycle of operation in accordance herewith for formulating the particular flame retardant composition includes selecting a standard available sodium antimonate with a particle size of within the range of between about 2-45 microns and with an averaage particle size of 8 microns and reducing this composition by pulverizing with either a wet or dry process so that the individual particles of the sodium antimonate are of a size of within the range of between about 0.1-8 microns, and with an average particle size of 1.5 microns. Thereafter, the reduced sodium antimonate composition in accordance herewith is neutralized to a pH with the range of between about 6.8-7.0 with an acid selected from the group consisting of mineral acids, carboxylic acids, and partially neutralized difunctional acids, such as chlorendic and phosphoric acids and ammonium acid phosphate.

The results achieved with the use of the particular reduced sodium antimonate composition herein even before neutralization are most surprising because the amount of antimony necessary for achieving the same flame retarding characteristics as that achieved by the prior art is substantially less. As one example of the surprising results achieved one may note that the same test results were achieved when a polyvinyl chloride (PVC) film was prepared and tested according to ASTM 1433-58 in which a minimum of 4 parts of a standard routinely available sodium antimonate composition was added to the polyvinyl chloride formulation.

In this test, the flame emanating from a source of butane gas and coming from a number 22 hypodermic needle is placed within one-half inch of 10 different test specimens 3 inches in width by 9 inches in length and having the same average thickness. The specimens are placed in a holder, with the source of flame and the specimen holder being placed in a cabinet so as to reduce any interfering air currents. A string is extended across the front of the specimen and another string is extended across the rear of the specimen with the distance between the two strings being approximately 6 inches. A flame is then applied to the specimen and any specimens which commence to burn through the lower string but extinguish before reaching the upper string are designated as "self-extinguishing." Specimens which extinguish before the lower string is burned are designated "non-burning." Any specimens which extinguish before reaching this lower string, which is 2 inches from the application of the flame, are therefore, designated as "non-burning."

With this test, and with 4 parts of the standard sodium antimonate composition contained in the PVC film the flame spread was reduced from 6 inches to less than 2 inches. When the particular sodium antimonate composition in accordance herewith was used, only 1 part was necessary in order to achieve the same reduction in flame spread according to the test noted above. Thus, with the tests noted above, 4 parts of commercially available sodium antimonate are necessary to reduce the flame spread from a designation of burning to one of "non-burning" whereas only 1 part of the sodium antimonate composition prepared in accordance herewith is necessary to achieve the same results.

This is most unexpected and surprising because it is well known in the art that, routinely, increases in the antimony content of various flame retardant compositions are necessary for increasing the flame retarding efficiency of antimony containing flame retardant compositions.

As further evidence of this, one may note Table I below in which three different commercially available antimony trioxide flame retrdant compositions are noted. The different commercially available compositions are different only in the particle size of the various individual particles thereof. However, all three have approximately the same flame retarding efficiency.

TABLE I

Particle Size

Antimony oxide — 2.5 microns average
Antimony oxide — 1.5 microns average
Antimony oxide — 0.9 microns average As noted above, the flame retardant compositions, in accordance herewith, are particularly appropriate for dispersion in such synthetic resin compositions as polyolefins, including polypropylene and polyethylene, and for polyvinyl chloride and copolymers thereof. As purely illustrative of the flame retardant results achieved in accordance herewith, a plurality of polyvinyl chloride specimens were prepared each containing the same ingredients and portions of ingredients while some of the specimens contained flame retardant compositions in accordance herewith while other specimens contained standard antimony oxide and commercially avaliable sodium antimonate. More specifically, the specimens contained 100 parts (by weight of the composition) polyvinyl chloride, 41 parts dioctyl phthalate, 10 parts epoxidized soy bean oil, 2.5 of a heat stabilizer containing barium, cadmium, zinc and phosphorus, as well known, and 0.5 parts stearic acid. Three sets of specimens were prepared with the above-noted PVC formulation and with each set containing 1 part of one of the following flame retardants: commercially available sodium antimonate having a particle size of within the range of between about 2-45 microns, antimony trioxide having a particle size of between about 0.5-25 microns and the sodium antimonate composition prepared in accordance herewith.

Milled film was prepared from the above-noted formulations having a thickness of 18 mils. Sample specimens were prepared from this film and the specimens were burned according to the test procedure ASTM 1433-58. The flame spread of 18 mil. film containing sodium antimonate 2-45 microns was 6 inches. The flame spread for films containing the antimony trioxide flame retardant was 1.8 inches, and the flame spread for the films containing the sodium antimonate composition in accordance herewith was 1.7 inches.

Thus, the results indicate that the film containing the commercially available sodium antimonate did not even have a "self-extinguishing" desingnation according to this test. By comparison, the specimens containing the standard antimony trioxide flame retarding composition had a flame spread designated "non-burning" as well as the specimens containing the particular flame retarding composition in accordance herewith which was slightly more effective than a standard antimony trioxide flame retardant composition.

The surprising thing is that sodium antimonate only contains about 59.2% antimony while the antimony trioxide contains about 83% antimony. Thus, there is a substantial reduction of approximately 30% in the antimony content between these two compositions which provided almost the same results with the sodium antimonate composition in accordance herewith providing slightly better results. As noted above, these results are most surprising because, as well known in the art, it has always proved necessary to increase the antimony content in order to improve flame retarding efficiency.

The results of the examples discussed above may be noted in Table II below. It is to be understood, however, that these examples are being presented with the understanding that they are to have no limiting character on the broad disclosure of the invention as generally set forth herein and as directed to men skilled in the art.

TABLE II

|  | Particle Size | Flame Spread* |
|---|---|---|
| 1 part Antimony Trioxide | .5 – 25 microns | 1.8 inches |
| 1 part Sodium Antimonate | 2 – 45 microns | 6.0 inches |
| 1 part Sodium Antimonate | .1 – 8 microns | 1.7 inches |

*Average of 10 specimens

As noted above, the results achieved with the flame retardant compositions in accordance herewith are further enhanced if those compositions are neutralized in the presence of acids to a pH of within the range of between about 6.8 and 7.0. The acids which have proved most effective for neutralizing the reduced sodium antimonate compositions in accordance herewith are mineral and carboxylic acids as well as neutralized difunctional acids, such as chlorendic acis, phosphoric acid, and ammonium acid phosphate.

As purely illustrative of the results achieved in accordance herewith utilizing polyethylene as the resin and the preferred flame retardant composition in accordance herewith of the reduced sodium antimonate composition neutralized to a pH of between about 6.8–7 with either chlorendic acid, acetic acid, phosphoric acid, or ammonium acid phosphate, one may note the results listed in Table III wherein the results of several formulations are listed using a polyethylene formulation containing 100 parts (in parts by weight of the final composition) polyethylene, 8 parts Chlorowax 70S (a chlorinated paraffin containing 70% chlorine and manufactured by Diamond Alkali Company), 8 parts of one of the sodium antimonate compositions noted in the Table, and 0.7 parts pentaerythritol stabilizer. The various polyethylene formulations were milled, pressed and cut into ⅛ inch × ⅛ inch × 6 inch strips.

The strips were burned according to the G.E. Flammability Tester. This tester is reported and described in the November 1966 issue of *Modern Plastics* at pages 141–148 and 192. The test involves placing samples in a vertically disposed Pyrex tube of approximately 3.5 inches in diameter which has a bed of glass beads disposed in the bottom thereof and a smaller Pyrex tube of approximately 7 mm. in diameter disposed vertically upright inside the larger tube. The specimens are suspended above the smaller tube and a gas is introduced in the bottom of the larger tube and flows up through the glass beads with the gas being either oxygen or nitrogen or a combination of the two. The flow of the gas is controlled through specially prepared and monitored orifices.

Thereafter, a flame is touched to the resin samples and depending upon their burning characteristics in such an environment an oxygen index is determined for the particular samples being burned according to the formula $$\text{Oxygen Index} = n = \frac{[O_2]}{[O_2] + [N]}$$

Specimens with an oxygen index of 0.21 or less burn very rapidly in air while an oxygen index of more than 0.21 would indicate the specimen would burn sluggishly in air.

As noted in the test procedure, a standard polyethylene composition has an oxygen index of around 0.174 plus or minus 0.001. From Table III noted below, it can be seen that the neutralized sodium antimonate composition in accordance herewith provides enhanced results in the polyehtylene formulation noted above even over the non-neutralized sodium antimonate composition in accordance herewith, whether the neutralizing environment is chlorendic acid or phosphoric acid.

TABLE III

|  | Particle Size | Oxygen Index* |
|---|---|---|
| Sodium Antimonate | .1 – 8 microns | .233 |
| Sodium Antimonate neutralized with chlorendic acid | .1 – 8 microns | .243 |
| Sodium Antimonate neutralized with phosphoric acid | .1 – 8 microns | .239 |

*Average of 10 specimens

As further illustrative of the enhanced results obtained with the neutralized and reduced sodium antimonate flame retardant herein, the yellowness indices of prepared polyethylene samples were compared, with the polyethylene formulation being the same as that noted above for Table III. The specimens were tested according to ASTM D1925-63T, in which the increase in yellowness of the samples after exposure in an oven at 350°F. (176°C.) was measured.

From Table IV, noted below, it can be seen that enhanced results are achieved in a substantial reduction in the yellowness index of samples containing the neutralized, reduced sodium antimonate herein as compared to the samples containing reduced sodium antimonate which is not neutralized.

TABLE IV

| POLYETHYLENE YELLOWNESS INDEX | |
|---|---|
| Sample | Yellowness Index* |
| Control-containing no flame retardant | 10.11 |
| Reduced Sodium Antimonate | 33.04 |
| Reduced and neutralized Sodium Antimonate | 16.39 |

*Average of 10 specimens

As can be seen, flame retardancy is achieved with the reduced and neutralized sodium antimonate, in accordance herewith, simultaneously with a yellowness index almost within the range of the control sample containing no antimony flame retardant which is most surprising in view of the well-known fact that antimony containing flame retardants have a tendency to produce undesirably high yellowness indices.

As further exemplary of the enhanced heat stability achieved using the neutralized reduced sodium antimonate, in accordance herewith, a plurality of polyvinyl chloride specimens were prepared in the same manner and with the same components and amounts of components as that discussed for Table II above with the comparison being between the reduced sodium antimonate herein and the neutralized and reduced sodium antimonate. The compartive results may be noted in Table V below in which the heat stability was measured in terms of the yellowness indices obtained in tests according to ASTM 1925-63T in which the increase in yellowness after exposure in an oven at 350°F. (176°C.) was measured.

TABLE V

HEAT STABILITY TEST - PVC

| Time | Flame Retardant | Yellowness Index* |
|---|---|---|
| 0 | Reduced Sodium Antimonate | 3.56 |
| 15 | Reduced Sodium Antimonate | 5.11 |
| 30 | Reduced Sodium Antimonate | 9.78 |
| 45 | Reduced Sodium Antimonate | 33.78 |
| 0 | Neutralized & Reduced Sodium Antimonate | 2.48 |
| 15 | Neutralized & Reduced Sodium Antimonate | 3.39 |
| 30 | Neutralized & Reduced Sodium Antimonate | 7.36 |
| 45 | Neutralized & Reduced Sodium Antimonate | 23.38 |

*Average of 10 specimens

As is readily apparent from Tables IV and V, in those instances where clear resins are to be used or in which enhanced color stability is important the neutralized and reduced sodium antimonate flame retardant compositions, in accordance herewith produce simultaneously good flame retardancy with substantial reduction in antimony content together with improved color stability and sustained clarity.

Accordingly, and as will be apparent from the foregoing, there are provided in accordance herewith, methods and compositions for imparting flame retardancy to a wide variety of resins while simultaneously substantially reducing the content of antimony necessary for achieving the same flame retarding characteristics as prior art flame retardant compositions. Furthermore, the resin compositions produced in accordance herewith have the flame retardant characteristics noted while in addition thereto have improved color stability including reduced yellowness indices and sustained clarity. Furthermore, the flame retardant compositions herein have no deleterious effect upon the final resin compositions into which they are incorporated nor do they interfere with the processing thereof. Finally, because of the substantially reduced content of antimony necessary to provide the results achieved in accordance herewith, a wide range of resin compositions can be usefully and economically flame retarded for making commercial products at a reduced cost thus making the compositions and formulations herein highly advantageous commercially.

While the methods and compositions herein disclosed form preferred embodiments of this invention, this invention is not limited to those specific methods and compositions, and changes can be made therein without departing from the scope of this invention which is defined in the appended claims.

What is claimed is:

1. a resin composition possessing enhanced flame retardant characteristics and consisting essentially of
   1. a halogen-containing material selected from the group consisting of (a) halogen-containing polymers which are in turn selected from the group consisting of homopolymers and copolymers of vinyl chloride and halogen-containing polyolefins and (b) combinations of non-halogenated polymers with an organic halogen source, said non-halogenated polymers being in turn selected from the group consisting of polyesters and polymerized ethylenically unsaturated hydrocarbons, and
   2. a flame-retarding amount of sodium antimonate, the particles of which exhibit an average size of about 1.5 micron, the size of the individual particles being between about 0.1 and 8 microns.

2. A composition as claimed in claim 1 in which the said sodium antimonate is neutral, the pH thereof being within the range of between about 6.8 and 7.

3. A composition as described in claim 1 in which said sodium antimonate is introduced into said resin in the amount within the range of between about 0.5 to 7 parts per one hundred parts resin.

4. A composition as described in claim 3 in which said sodium antimonate is introduced into said resin in the amount within the range of between about 1 to 5 parts per one hundred parts resin.

5. A composition as recited in claim 1 in which said resin is polyethylene.

6. a composition as recited in claim 1 in which said resin is polyvinyl chloride.

7. A composition as recited in claim 2 in which said resin is polyethylene.

8. A composition as recited in claim 2 in which said resin is polyvinyl chloride.

* * * * *